Patented June 21, 1949

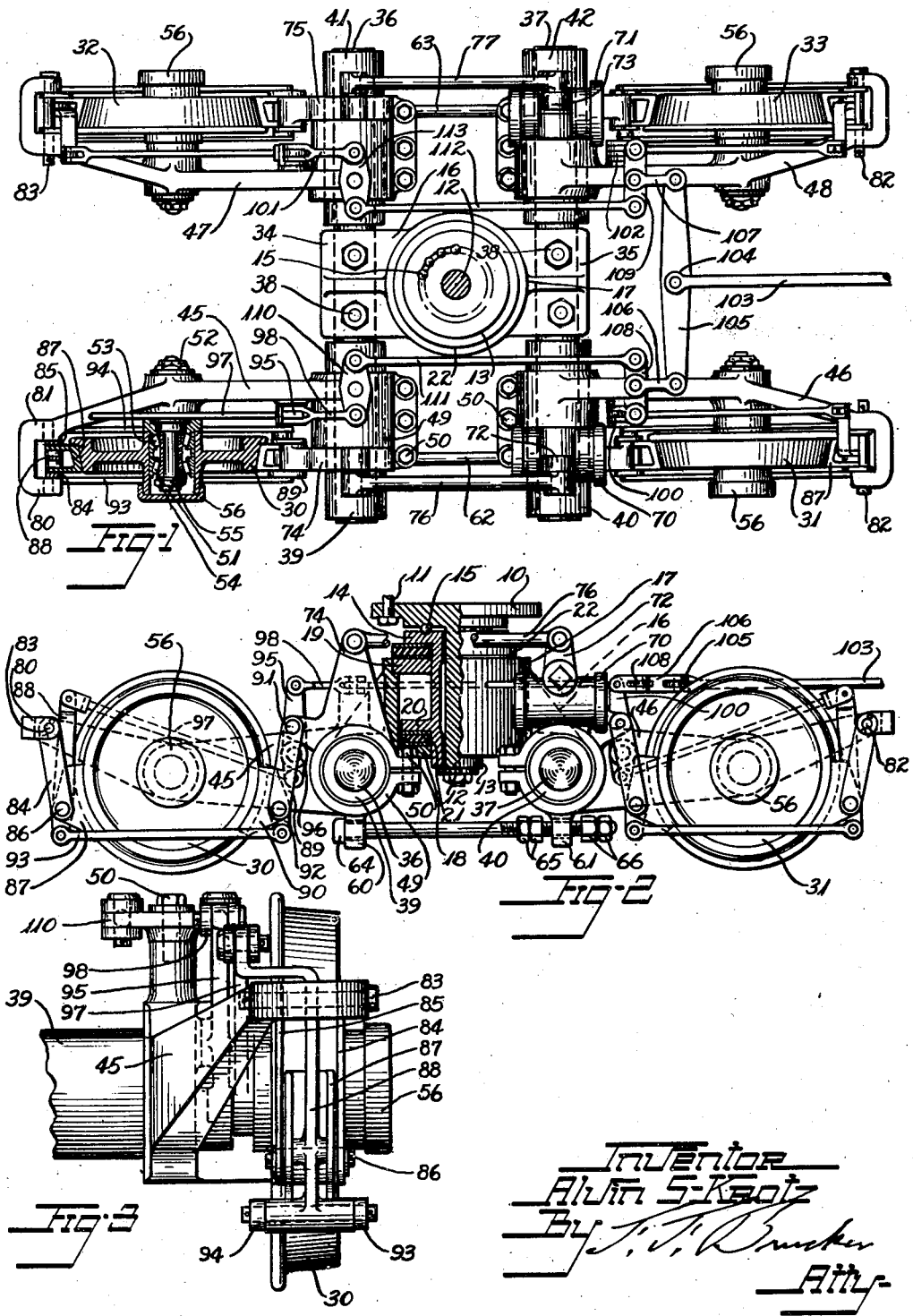

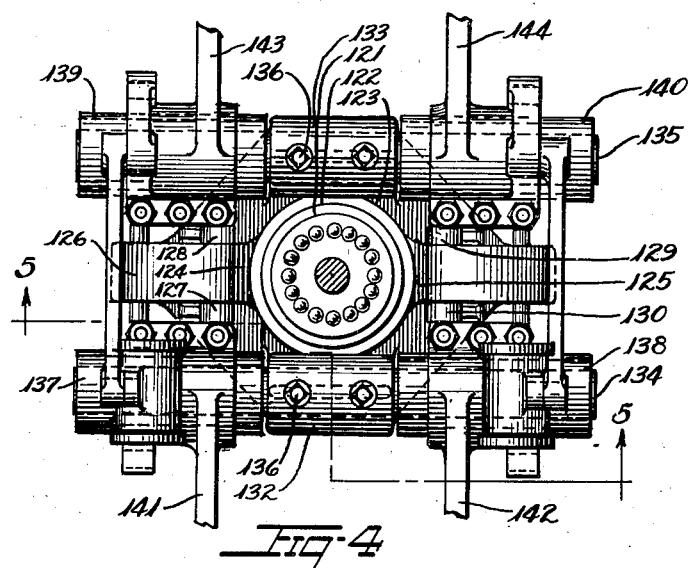
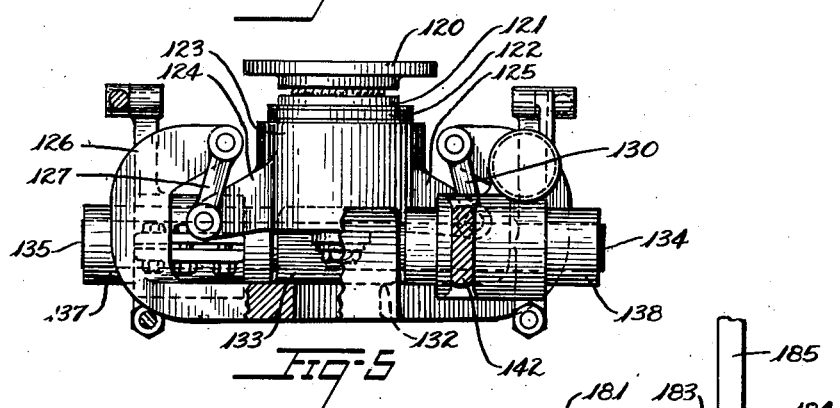
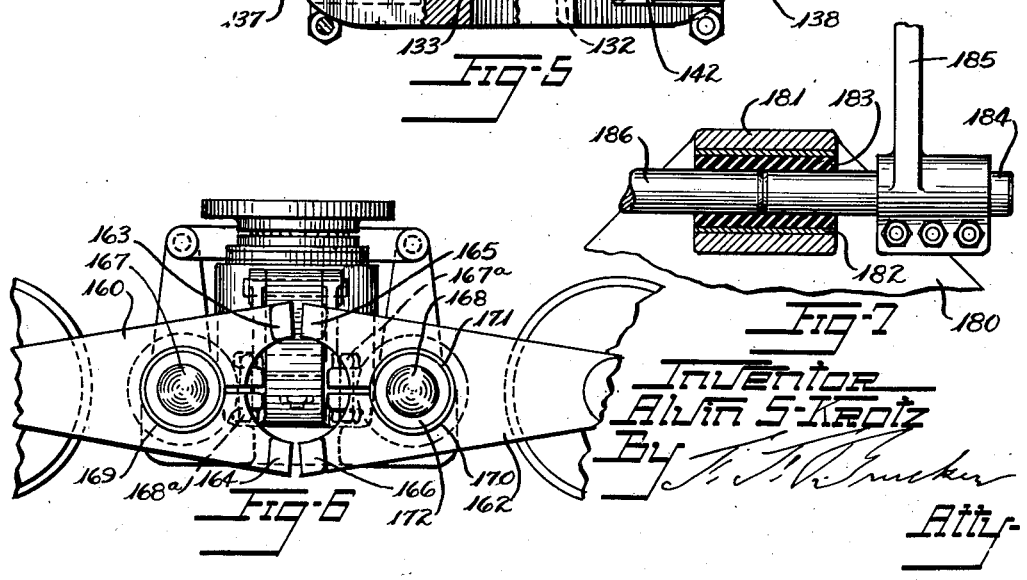

2,473,714

UNITED STATES PATENT OFFICE 2,473,714

RAIL TRUCK SUSPENSION

Alvin S. Krotz, Akron, Ohio, assignor to The B. F. Goodrich Company, New York, N. Y., a corporation of New York Application July 3, 1945, Serial No. 603,051

14 Claims. (Cl. 105—182)

This invention relates to vehicle trucks and more particularly to trucks of vehicles for operation on rails.

With increase of speed of operation of railway trains and similar rail operated vehicles it has become desirable to provide more effective cushioning of the load, to improve riding comfort, and to reduce noise and vibration, as well as to improve braking of the vehicle.

The principal objects of the present invention are to provide a rail truck with independent wheel suspension, to provide effective cushioning of the load, to provide effective braking of a vehicle having independent wheel suspension, to provide for control of side sway of the car body, and to provide adjustment of the wheels to different gauges of track.

These and other objects will appear from the following description and the accompanying drawings.

Of the drawings:

Fig. 1 is a plan view of a vehicle truck constructed in accordance with and embodying the invention, parts being broken away.

Fig. 2 is a side elevation of the same, parts being broken away.

Fig. 3 is a detail view of one of the wheels and its brake mechanism, parts being broken away.

Fig. 4 is a plan view of a modified form of the invention, the torsion arm and wheels being broken away.

Fig. 5 is a sectional detail view taken on line 5—5 of Fig. 4.

Fig. 6 is a side elevation of another modification of the invention, parts being broken away.

Fig. 7 is a detail view of a further modification of the invention.

Referring to the drawings, and first to Figs. 1 to 3 thereof, the car body (not shown) is secured to a bearing plate 10 as by bolts 11. The plate 10 has a king pin 12 integral therewith which extends vertically through a center bearing 13. The center bearing has an outwardly extending flange 14 having a raceway in its upper face and antifriction balls 15 may be interposed between the flange and the bearing plate within the raceway to reduce friction. The center bearing is supported by a body supporting structure 16 formed with a barrel 17 having a vertical axis. The barrel has an inwardly directed flange 18 at its lower end and is counterbored at its upper end to provide a shoulder for supporting a removable flange ring 19. The center bearing has an outwardly directed flange 20 which extends over the flange 18 and the flange 14 thereof extends over the flange ring 19. Between the flanges 18 and 20, a cushioning ring 21 including a body of soft resilient vulcanized rubber or other rubber-like material having metal facings on its upper and lower faces and secured thereto, as by a bond of vulcanization, cushions the load between the center bearing and the barrel and permits lateral movement of the center bearing, the flange 18 and flange ring 19 terminating short of the center bearing to permit such movement. A similar cushioning ring 22 is supported by flange ring 19 between it and the flange 14 of the center bearing, so that the cushioning rings together support the entire load of the car body, while permitting side sway thereof which is resisted by tension of the cushioning rings in shear.

For transmitting the load to the rail wheels 30, 31, 32, 33, the body supporting structure is provided with ears 34, 35, having apertures extending laterally of the truck for engaging cross shafts 36, 37. The cross shafts are parallel to each other and are secured in the ears against rotation, as by set screws 38. Each shaft extends at each side of the barrel 17 and the extending ends support torsion spring structures 39, 40, 41, 42, one on each extending end. Each spring structure includes a cylindrical housing of metal and a body of resilient soft vulcanized rubber or other rubber-like material surrounding the shaft between the shaft and the housing and secured to both, as by a bond of vulcanization. The housing of each spring structure is secured to one of a set of similar torsion arms 45, 46, 47, 48 which are individually supported by the rail wheels as hereinafter described.

As the arms are of the same construction, only the arm 45 will be described. This arm has a split collar 49 adapted to engage the outer face of the housing of the spring structure 39. Bolts 50 are provided to clamp it against the housing. A stub axle 51 is fixed to the arm and is secured thereto by a nut 52 threaded on a reduced portion thereof. The wheel 30 is rotatably journaled on the stub axle and roller or similar antifraction bearings 53, 54 are provided between the axle and the wheel to reduce friction. The roller bearings are held in place by a nut 55 threaded on the axle and are protected from dust by a hub cap 56 secured to the hub of the wheel. The arrangement is such that by loosening the bolts 50, the arm may be adjusted with respect to the torsion spring structure both angularly to adjust the tension of the spring structure when the arm is horizontal, or axially of the spring structure to adjust the wheels to tracks of different gauge.

To provide means for limiting movement of the torsion arms, each arm is provided with a depending apertured ear, such as 60, 61 and threaded rods 62, 63 extend through clearance apertures in the ears of each pair of torsion arms at a side of the truck. The rods have heads 64 at one end thereof and are threaded at the other end to receive stop nuts 65, 66 at each side of the ear 61. The arrangement is such that the stop nuts may be adjusted along the rod to provide the proper clearance for the desired torsion arm movement.

Additional means may be provided for controlling or damping the deflection of the torsion arms, and for this purpose devices 70, 71 of the hydraulic damping type may be fixed to the torsion arms 46, 48 and provided with operating arms 72, 73. Arms 74, 75 may be fixed to torsion arms 45, 47 and links 76, 77 may be pivotally connected between arms 74 and 72 and arms 75 and 73 respectively.

In checks of this type, which are of well known construction, movement of a piston through a cylinder filled with a non-compressible liquid is resisted by restricted flow of the liquid from one end of the cylinder to the other through a bypass and the piston is connected to the operating arm by suitable gearing. The arrangement is such that deflection of the torsion arms is resisted by the checking device.

To provide braking mechanism effective in braking the wheels while permitting independent suspension thereof, each torsion arm is provided with brake mechanism for the wheel mounted thereon. The mechanism on each wheel is similar and the mechanism mounted on arm 45 is as follows:

Arm 45 is formed at its outer end with opposed hanger supporting bosses 80, 81 having aligned bores for receiving pivot pins 82, 83 on which hanger links 84, 85 are pivotally suspended. The lower ends of the links pivotally support a pin 86 on which a hollow brake shoe 87 is pivotally supported between the links. Fulcrumed about the pin 86 within the sides of the brake shoe is a lever arm 88.

At the other side of the wheel a pair of hanger links, such as 89 similarly suspend a similar brake shoe 90 from aligned pivot pins such as 91 on arm 45, and a brake lever 92 is pivotally fulcrumed on the brake shoe 90 with its upper end pivotally secured at 91 to the arm 45. A pair of links 93, 94, one at each side of wheel 30, connect the lower ends of levers 88 and 92. A vertical lever 95 is pivotally secured, as at 96 to arm 45. Its lower end is pivotally connected by a link 97 to lever 88, and its upper end is engaged by an actuating rod 98. The arrangement is such that movement of rod 98 to the left in Figs. 1 and 2 forces brake shoes 87 and 90 against the wheel.

The brakes for wheels 31, 32, and 33 are similarly controlled by levers 100, 101, 102 respectively.

For applying the brakes in unison an operating rod 103 actuated by a brake operating cylinder (not shown) is connected as at 104 to an equalizer arm 105, the ends of which are connected by links 106, 107 to the centers of equalizer arms 108, 109. One end of equalizer arm 108 is connected to lever 100 and the other end is connected by a link 111 to one end of a motion reversing lever 110 the other end of which is connected to link 98. The lever 110 is pivoted at its center on torsion arm 45. One end of equalizer arm 109 is connected to lever 102 and the opposite end is connected by a link 112 to a motion reversing arm 113 pivoted on torsion arm 47. The other end of arm 113 is connected to lever 101. The arrangement is such that a pull on rod 103 to the right of Figs. 1 and 2 sets all of the brake shoes against the wheels simultaneously.

With a truck of this description the torsion arms may be deflected independently in a vertical direction while simultaneous brake action is provided and side sway of the vehicle body is accommodated and controlled by the cushion rings 21 and 22 under shear stress of the rubber-like material.

In the form of the invention illustrated in Figs. 4 to 5, even greater amount of side sway of the vehicle body is permitted. In this construction the bearing plate 120 supports the car body from a center bearing 121 supported by cushioning rings such as 122 of rubber-like material within a barrel 123, the internal construction of the barrel and center bearing being identical to that shown in Fig. 2. The barrel, however, is provided with ears 124, 125 by which it is supported from a yoke 126 by links 127, 128, 129, 130. The links may be parallel or upwardly convergent or divergent as desired but are shown as upwardly convergent in arrangement so that movement of the center bearing to the left in Fig. 5 rotates the car body about a metacenter occurring above the center bearing at the intersection of the extended lines intersecting the pivotal center of each link.

The yoke 126 is provided with bearings 132, 133 in which shafts 134, 135 corresponding to the parallel core shafts 36, 37 of Figs. 1 and 2 are secured, as by set screws 136. Torsion spring structures 137, 138, 139, 140, each comprising an outer sleeve or housing of metal and a bushing of resilient soft vulcanized rubber or other rubber-like material therewithin and secured as by a bond of vulcanization to its housing and also to the shaft which it surrounds, are mounted on the projecting ends of the shafts 134, 135 and are engaged by torsion arms 141, 142, 143, 144 corresponding in construction and operation to the torsion wheel supporting arms 45, 46, 47 and 48 of the truck of Fig. 1, which in turn support wheels and brake mechanism as in the construction previously described.

In the modification shown in Fig. 6, the construction is the same as that shown in Figs. 4 and 5, but the wheel supporting torsion arms 160, 162 are provided with integral stops 163, 164 and 165, 166 respectively for limiting their movment. The stops 163, 165 are adapted to engage each other upon extreme deflection of arms 160, 162 about shafts 167, 168 in a direction caused by overloading of the car body, and the stops 164, 166 are adapted to engage each other upon extreme deflection in the opposite direction. Each arm is adjustably secured, as by bolts 167ᵃ, 168ᵃ passing through ears of a split hub of the arm about a torsion spring structure 169, 170 secured to one of the shafts 167, 168. Each torsion spring structure preferably comprises an outer cylindrical housing 171 and a resilient bushing 172 of soft vulcanized rubber or other rubber-like material bonded to the housing and the shaft as by a bond of vulcanization and capable of supporting the load on one of the wheels by torsional distortion.

In the modification of the invention illustrated in Fig. 7, the numeral 180 designates a yoke corresponding to the yoke 126 of Figs. 4 and 5, and formed with bearings scuch as 181 corresponding to the bearings 132, 133 of Fig. 4. In this construction, however, the outer housing 182 of a torsion spring structure is adjustably clamped in the bearing 181 and surrounds a body 183 of resilient rubber-like material through which a shaft 184 partially extends. The shaft and the housing are bonded to the body of rubber-like material, as by a bond of vulcanization. A wheel engaging torsion arm 185 is adjustably secured to the shaft and corresponds to the arm 144 of Fig. 4. A second shaft 186 in axial alignment with shaft 184 also extends into the body 183 and engages the opposite wheel through a similar torsion arm. It is also bonded to the rubber body. The arrangement is such that the torsion arms have independent action as in the forms of the invention previously described, the truck corresponding in construction to that shown in Figs. 4 and 5 except for the shaft and torsion spring construction. The shafts 184 and 186 may be made integral in which case the arms thereon can be deflected only in unison. In place of the single housing 182 and single body 183 a pair of torsion spring structures may be held by the same bearing 181 in end to end relation and each engaging its own torsion shaft.

The invention provides for accommodating individual deflection of the wheels of a truck such as would be caused by higher elevation of a portion of the track as upon entering or leaving banked curves. It also provides for adjustment of the wheels laterally of the truck to different gauges of track. Side sway of the car is accommodated by the floating support of the center bearing, while the usual truck side frames are eliminated.

While the wheels have been shown as mounted on roller bearings, ball or plain bearings may be substituted therefor.

Variations may be made without departing from the scope of the invention as it is defined by the following claims:

I claim:

1. A multiple-wheeled truck for a rail-type vehicle, said truck comprising a center bearing for pivotally supporting a car, a resilient torsion spring structure, said structure comprising an inner member, an outer member, and a resilient body of rubber-like material between said inner and outer members and secured thereto, one of said members being non-rotatably secured with relation to said center bearing, a torsion arm, a securing member thereon adjustably secured to the other said member for adjustment axially thereof to vary the gage, and a rail wheel rotatably secured to said arm for movement with said arm independently of the other wheels of the truck.

2. A multiple-wheeled truck for a rail-type vehicle, said truck comprising a center bearing for pivotally supporting a car, a resilient torsion spring structure, said structure comprising an inner member, an outer member, and a resilient body of rubber-like material between said inner and outer members and secured thereto, said center bearing being supported from one of said members for vertical movement, a torsion arm, a securing member thereon adjustably secured to the other said member for adjustment axially thereof to vary the gage, and a rail wheel rotatably secured to said arm for movement with said arm independently of the other wheels of the truck.

3. A multiple-wheeled truck for a rail-type vehicle, said truck comprising a center bearing for pivotally supporting a car, a resilient torsion spring structure, said structure comprising an inner member, an outer member, and a resilient body of rubber-like material between said inner and outer members and secured thereto, link means supporting said center bearing from one of said members and permitting movement of said center bearing axially of said member, a torsion arm, a clamp member thereon adjustably secured to the other said member for adjustment axially thereof to vary the gage, and a rail wheel rotatably secured to said arm for movement with said arm independently of the other wheels of the truck.

4. A multiple-wheeled truck for a rail-type vehicle, said truck comprising a center bearing for pivotally supporting a car, a resilient torsion spring structure, said structure comprising an inner member, an outer member, and a resilient body of rubber-like material between said inner and outer members and secured thereto, a yoke about said center bearing, link means for supporting said center bearing from said yoke, means on said yoke for securing one of the members of said spring structure, a torsion arm, a clamp member thereon adjustably secured to the other said member for adjustment axially thereof to vary the gauge, and a rail wheel rotatably secured to said arm for movement with said arm independently of the other wheels of the truck.

5. A truck for a rail-type vehicle, said truck comprising a center bearing for pivotally supporting a car, a resilient spring structure, a torsion arm carried by said spring structure, a rail wheel rotatably mounted on said arm, and means for adjustably securing said torsion arm to said spring structure with respect to said center bearing in a plurality of positions laterally of said truck.

6. A truck for a rail-type vehicle, said truck comprising a center bearing for pivotally supporting a car, a resilient spring structure, said spring structure comprising an outer member, an inner member, and a body of rubber-like material therebetween and secured thereto, means for securing one of said members to said center bearing, and means on the other said member and adjustable longitudinally thereof for supporting said spring structure from a rail wheel.

7. A truck for a rail-type vehicle, said truck comprising a center bearing, a pair of resilient spring structures each comprising a shaft, a pair of housings thereabout, and a resilient body of rubber-like material between each housing and the shaft and secured thereto, means for holding the shafts of said spring structures in parallel relation, means for supporting said center bearing from said holding means and permitting lateral movement of said center bearing with relation thereto, a set of arms for supporting said center bearing through said spring structure, each arm being secured at one end thereof to one of said housings for vertical swinging movement independently of the other arms, and each arm having a rail wheel rotatably mounted on its opposite end, the rail wheels on respective arms being connected to each other only through said arms.

8. A truck for a rail-type vehicle, said truck comprising a center bearing for pivotally supporting a car, a set of rail wheels, resilient springing means secured to said center bearing, said springing means comprising an inner member, an outer member, and a resilient body of rubber-like material between said inner and outer members and secured thereto, and torsion arms extending fore and aft of said truck each between an independent wheel and said center bearing and comprising the sole means for guiding said wheels and transmitting the load from said center bearing thereto, each torsion arm being secured to one of said members of one of said spring structures for swinging movement of the arm and its wheel independently of the other arms and wheels, and the other member of said spring structure being secured to said center bearing.

9. A truck for a rail-type vehicle, said truck comprising a center bearing for pivotally supporting a car, a resilient spring structure, a torsion arm carried by said spring structure, a rail wheel rotatably mounted on said arm, means for adjustably securing said torsion arm to said spring structure to adjust the truck to tracks of different gauges, and brake means on said arm and movable therewith for braking said wheel.

10. A truck for a rail-type vehicle, said truck comprising a center bearing for pivotally supporting a car, a set of rail wheels, resilient spring means secured to said center bearing, a torsion arm supporting said spring means from a wheel, said torsion arm being adjustable along said spring means from position to position for adjusting the wheel to tracks of different gauge without change in the springing rate, and stop means on said torsion arm for limiting the deflection thereof under load.

11. A truck for a rail-type vehicle, said truck comprising a center bearing for pivotally supporting a car, a set of rail wheels, resilient spring means secured to said center bearing, torsion arms each supporting one of said spring means independently from a wheel, said torsion arms being adjustable along said spring means for adjusting the wheels to tracks of different gauge, and means secured between oppositely extending torsion arms for checking the speed of relative deflection of said arms under load.

12. A truck for a vehicle, said truck comprising a car-supporting structure, a set of wheels, resilient spring means mounted on said car-supporting structure, torsion arms extending forwardly and rearwardly from said car-supporting structure in oppositely extending pairs, each torsion arm supporting one of said spring means independently from a wheel, and means secured between oppositely extending torsion arms of a pair for checking the speed of relative deflection of said arms under load.

13. A truck for rail-type vehicles, said truck comprising a car-supporting structure, a set of rail wheels, resilient spring means mounted on said car-supporting structure, torsion arms extending forwardly and rearwardly from said car-supporting structure in oppositely extending pairs, each arm supporting one of said spring means independently from a wheel, said torsion arms being adjustable along said spring means to vary the gage of the truck, and means secured between oppositely extending torsion arms of a pair for checking the speed of relative deflection of said arms under load.

14. A truck for a rail-type vehicle, said truck comprising an H-shaped car-supporting structure having means for supporting the car from its cross-bar, each limb of the car-supporting structure having a resilient spring means mounted thereon, torsion arms extending forwardly and rearwardly from said car-supporting structure in oppositely extending pairs mounted independently on said resilient spring means of adjacent parallel limbs of the car supporting structure, and a set of car wheels for supporting said torsion arms and their spring means, each torsion arm supporting one of said spring means independently from a car wheel.

ALVIN S. KROTZ.

REFERENCES CITED

The following references are of record in the file of this patent:

UNITED STATES PATENTS

| Number | Name | Date |
|---|---|---|
| 2,149,297 | Knox | Mar. 7, 1939 |
| 2,166,769 | Rabe | July 18, 1939 |
| 2,191,211 | Krotz | Feb. 20, 1940 |
| 2,251,950 | Piron | Aug. 12, 1941 |
| 2,253,042 | Muchnic | Aug. 19, 1941 |
| 2,320,086 | Ledwinka | May 25, 1943 |

FOREIGN PATENTS

| Number | Country | Date |
|---|---|---|
| 443,622 | England | Mar. 3, 1936 |